(12) United States Patent
Koch

(10) Patent No.: US 6,616,213 B2
(45) Date of Patent: Sep. 9, 2003

(54) COVER DEVICE FOR A FOLDING TOP COMPARTMENT

(75) Inventor: Michael Koch, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/193,676

(22) Filed: Jul. 12, 2002

(65) Prior Publication Data

US 2003/0020297 A1 Jan. 30, 2003

(30) Foreign Application Priority Data

Jul. 14, 2001 (DE) .......................... 101 34 373

(51) Int. Cl.$^7$ .................................................. B60J 7/00
(52) U.S. Cl. .......................... 296/107.08; 296/107.07; 296/107.17
(58) Field of Search ........................... 296/107.08, 224, 296/221, 107.17, 219, 210, 147

(56) References Cited

U.S. PATENT DOCUMENTS

| | | | | | |
|---|---|---|---|---|---|
| 2,046,574 | A | * | 7/1936 | Oliver ..................... | 296/107.08 |
| 2,181,869 | A | * | 12/1939 | Carr ....................... | 296/107.08 |
| 2,782,070 | A | * | 2/1957 | Chaban ................... | 296/107.08 |
| 3,180,677 | A | * | 4/1965 | Scott ...................... | 296/107.08 |
| 4,778,215 | A | * | 10/1988 | Ramaciotti ............. | 296/107.07 |
| 5,033,789 | A | * | 7/1991 | Hayashi et al. ......... | 296/107.08 |
| 5,295,722 | A | * | 3/1994 | Bonne et al. ........... | 296/107.08 |
| 5,769,483 | A | * | 6/1998 | Danzl et al. ............ | 296/107.08 |
| 6,019,416 | A | * | 2/2000 | Beierl .................... | 296/107.08 |
| 6,039,382 | A | * | 3/2000 | Mather et al. .......... | 296/107.08 |
| 6,149,221 | A | * | 11/2000 | Mentink ................. | 296/107.08 |
| 6,250,707 | B1 | * | 6/2001 | Dintner et al. ......... | 296/107.08 |
| 6,315,349 | B1 | * | 11/2001 | Kinnanen ............... | 296/107.17 |
| 6,425,621 | B2 | * | 7/2002 | Miklosi et al. ......... | 296/107.08 |
| 2001/0024050 | A1 | * | 9/2001 | Schutt et al. ........... | 296/107.08 |
| 2002/0003355 | A1 | * | 1/2002 | Mac Farland .......... | 296/107.08 |
| 2002/0030381 | A1 | * | 3/2002 | Schutt et al. ........... | 296/107.08 |
| 2003/0020298 | A1 | * | 1/2003 | Koch ..................... | 296/107.08 |
| 2003/0047961 | A1 | * | 3/2003 | Nania .................... | 296/107.08 |
| 2003/0052508 | A1 | * | 3/2003 | Obendiek .............. | 296/107.08 |

FOREIGN PATENT DOCUMENTS

| | | |
|---|---|---|
| DE | 3801148 C1 | 4/1989 |
| DE | 4446483 C2 | 2/1998 |
| DE | 19714105 A1 | 10/1998 |
| EP | 0882615 A1 | 12/1998 |
| FR | 2802477 A1 | 6/2001 |

* cited by examiner

*Primary Examiner*—Kiran Patel
(74) *Attorney, Agent, or Firm*—Crowell & Moring LLP

(57) ABSTRACT

With a cover device for a folding top compartment of a vehicle with a lowerable roof structure, in particular for a hardtop vehicle, it is possible to pivot the roof structure into the folding top compartment arranged behind the rear region in a back part of the vehicle bodywork. The compartment can be closed off with a folding top compartment lid which can be folded up towards the rear. A cover unit with a front cover part, a rear cover part, and two lateral cover parts can close a free space which is formed between the closed folding top compartment lid and the rear region. In order to simplify actuation of the individual cover parts, the front cover part is pivotably mounted on the vehicle bodywork, while the rear cover part is pivotably mounted on the front cover part and each of the lateral cover parts is pivotably mounted on the folding top compartment lid.

36 Claims, 5 Drawing Sheets

COVER DEVICE FOR A FOLDING TOP COMPARTMENT

This application claims the priority of German application 101 34 373.6, filed Jul. 14, 2001, the disclosure of which is expressly incorporated by reference herein.

BACKGROUND AND SUMMARY OF THE INVENTION

Attention is directed to co-pending U.S. patent application Ser. No. 10/193,676, titled COVER DEVICE FOR A FOLDING TOP COMPARTMENT, filed Jul. 12, 2002 and having the same inventive entity as the present application.

The present invention relates to a cover device for a folding top compartment of a vehicle with a lowerable roof structure, in particular for a hardtop vehicle, by which it is possible to pivot the roof structure into the folding top compartment arranged behind a rear region in a back part of the vehicle bodywork. The device includes a folding top compartment lid by which the folding top compartment can be closed and which can be folded up towards the rear of the vehicle, and a cover unit having a front cover part, a rear cover part, and two lateral cover parts, which can close a free space remaining between the front edge region of the closed folding top compartment lid and a rear edge region of the rear region.

German Patent Publication DE 44 46 483 C2 discloses such a cover device for a hardtop vehicle in which the roof structure has a front roof part and a rear window part connected thereto. The roof structure can be pivoted, by means of a positive control device supported on the bodywork, into the folding top compartment arranged behind a rear region in a back part of the vehicle bodywork. This folding top compartment can be closed with a folding top compartment lid which can be folded up towards the rear. In this process, a free space, which can be closed by means of a cover unit, is formed between a front edge region of the closed folding top compartment lid and a rear edge region of the rear region. This cover unit has a front cover part, a central cover part and a rear cover part, as well as two lateral cover parts. These cover parts form, in a closed position of the cover unit with the roof structure lowered, an essentially planar and, as it were, uninterrupted cover of the free space, which cover adjoins in a flush fashion the rear region and the folding top compartment lid.

In the known cover device, a folding device is provided in which the rear cover part and the central cover part can be moved into an upright folded position with their undersides bearing against one another. The lateral cover parts are also mounted on this folding device in such a manner that the lateral cover parts are also oriented vertically in the folded position. In this folded position, the central cover part and the rear cover part adjoin a rear edge region of the front cover part. It is necessary to be able to fold the cover parts in order to clear the adjustment path necessary for pivoting of the roof structure. All the cover parts can also be adjusted together in the longitudinal direction of the vehicle in the manner of a carriage. It is necessary to be able to adjust in the longitudinal direction of the vehicle so that, when the roof structure is lowered, it is possible to cover a gap which is only formed when the roof structure is lowered directly in front of the front edge region of the folding top compartment lid and which is closed off by a lower edge region of the rear window part when the roof structure is closed. The lateral cover parts are required in order to form a passage for the C pillars of the roof structure when the roof structure is closed. When the roof structure is closed, the lateral cover parts are folded onto the upper side of the central cover part. This arrangement of the lateral cover parts with the closed roof structure takes up in the interior of the vehicle and can be felt to be disruptive by respective vehicle occupants. Overall, with the known cover device, the implementation of the multiplicity of adjustment possibilities is relatively complex.

The present invention is concerned with the problem of specifying, for a cover device of the type mentioned, an advantageous embodiment which has a relatively economical design. Furthermore, the cover device is intended to require relatively little interior space.

This problem is solved according to the invention by way of a cover device having a front cover part which is pivotably mounted on the vehicle bodywork and, in the closed position of the cover unit, adjoins a rear edge region of the rear region and a front rear region of the rear cover part. The rear cover part is pivotably mounted on the front cover part and, in the closed position of the cover unit when the roof structure is lowered into the folding top compartment, adjoins a rear edge region of the front cover part and the front edge region of the folding top compartment lid. Each of the lateral cover parts is pivotably mounted on the folding top compartment lid and, in the closed position of the cover unit when the roof structure is lowered into the folding top compartment, adjoins lateral edge regions of the front cover part and rear cover part, the rear edge region of the rear region, and the front edge region of the folding top compartment lid.

Advantageous embodiments are defined by the dependent claims of this application. As a result of mounting the lateral cover parts on the folding top compartment lid as proposed according to the invention, the cover parts can be mechanically adjusted independently of the other cover parts, providing possibilities for simplifying the measures provided for adjustment of the lateral cover parts, for example for an actuator drive.

Preferably, when the roof structure is closed, the rear cover part can be folded onto the underside of the front cover part. In the cover device according to the invention, when the roof structure is closed, the rear cover part is not required. Advantageously, the rear cover part is folded away downwards from the interior of the vehicle so that the aesthetic appearance of the closed cover unit is maintained.

The rear cover part can be expediently shaped in such a way that, in the closed position of the cover unit, it fills a gap which is formed when the roof structure is lowered between the rear edge region of the front cover part and the front edge region of the closed folding top compartment lid. With this configuration, it is possible to dispense with the possibility of horizontally displacing the cover parts in the longitudinal direction of the vehicle, which considerably simplifies the design overall.

According to one preferred embodiment, when the roof structure is pivoted, the front cover part can assume a position in which it promotes pivoting. In this position, the front cover part is folded up towards the front and the rear cover part is folded onto the underside of the front cover part. This design permits the necessary adjustment path for pivoting adjustment of the roof structure to be implemented with relative ease.

According to one advantageous embodiment, the folding top compartment can be formed as a boot underneath a space provided for accommodating the roof structure. It is possible to fold the folding top compartment lid up towards the front in order to open the boot, the front cover part assuming, when the boot is opened and the roof structure lowered, a position in which it promotes loading. In this position, the front cover part is folded up towards the front and the rear cover part is folded onto the underside of the front cover part. When the roof structure is lowered, it is arranged in the folding top compartment above the boot. In order to improve the accessibility of the boot, a function which promotes loading can be actuated when the folding top compartment lid is folded up towards the front in order to open the boot. This function causes the lowered roof structure to be folded up towards the front. The inventive position which promotes loading of the front cover part enables the entire kinematics of the roof structure to be simplified and improved.

In another embodiment, when the roof structure is closed, the lateral cover parts can be folded onto the underside of the folding top compartment lid. With this design, the lateral cover parts are thus folded away from the interior of the vehicle if they are not required. This improves the aesthetics of the cover unit when the roof structure is closed.

In one advantageous embodiment, drive means for pivoting adjustment of the front cover part can be provided. The drive means are mechanically positively coupled to a positive control device, supported on the bodywork, for pivoting the roof structure. By this design, the pivoting adjustment of the front cover flap is integrated into the positive control device of the roof structure, enabling a reliable mode of operation to be ensured.

In a corresponding way, in another development, drive means for pivoting adjustment of the rear cover part may be provided. The drive means are mechanically positively coupled to the positive control device of the roof structure. In this way, pivoting adjustment of the rear part can also be positively coupled to the kinematics of the roof structure so that, here too, malfunctions can be excluded.

Furthermore, in one variant, a drive means for the synchronous pivoting adjustment of the lateral cover parts may be provided. The drive means are electrically or electronically coupled to the positive control device of the roof structure. This coupling, for example by way of electrical sensors or switches, enables the kinematics of the lateral cover parts to be isolated from the kinematics of the roof structure. Furthermore, this design permits a simpler structure for the drive means of the lateral cover flaps. For example, a pneumatic or hydraulic or electric drive can be provided on the folding top compartment lid.

Further important features and advantages of the invention emerge from the subclaims, from the drawings and from the associated description of the figures with reference to the drawings.

It goes without saying that these features which are mentioned above and explained below can be used not only in the respectively specified combination but also in other combinations or in isolation without departing from the scope of the present invention.

A preferred exemplary embodiment of the invention is illustrated in the drawings and will be explained in more detail in the following description.

BRIEF DESCRIPTION OF THE DRAWINGS

In the drawings, which are each schematic.

DETAILED DESCRIPTION OF THE INVENTION

Figure 1:
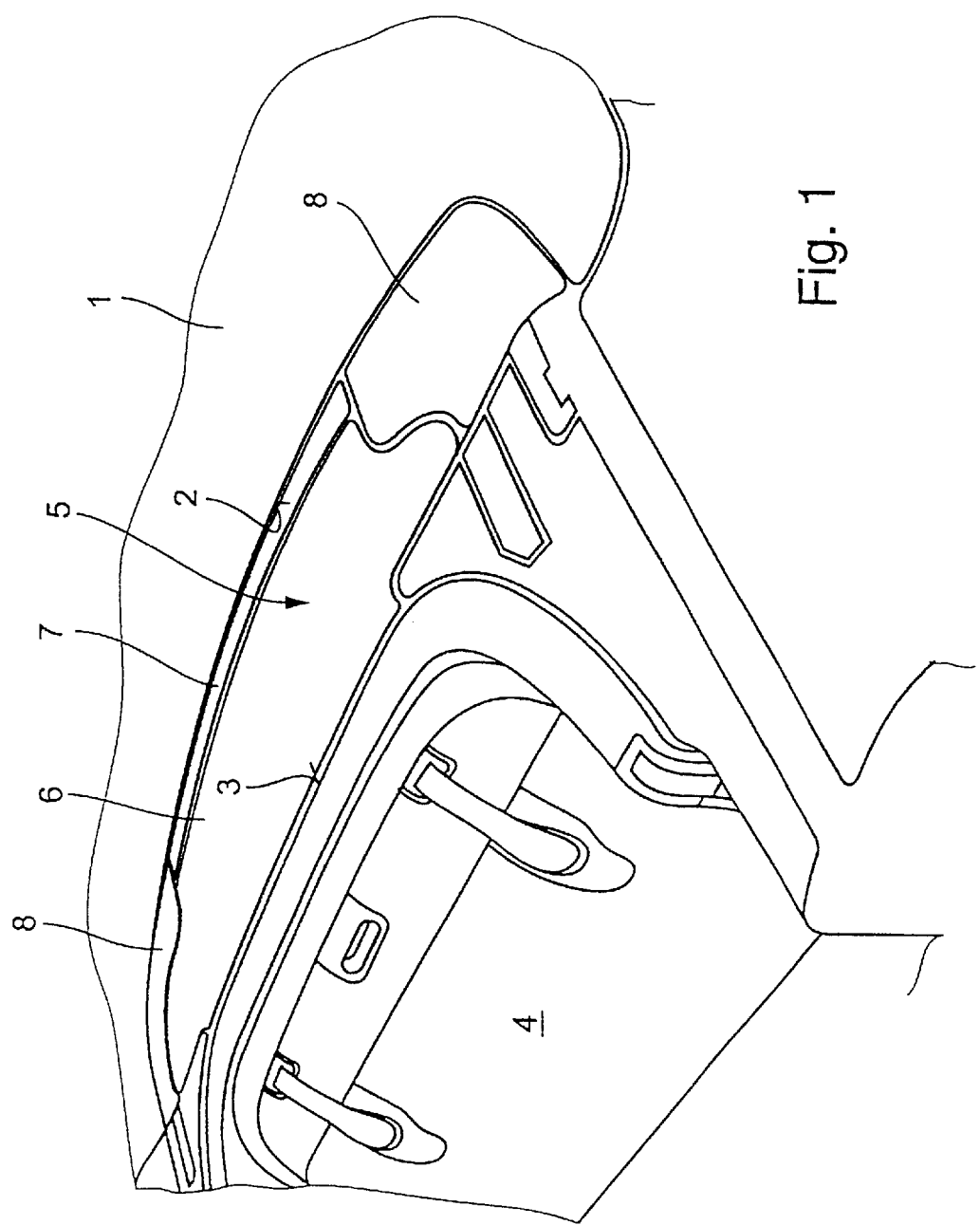
FIG. 1 shows a perspective view of a back part of a passenger car which is equipped with a cover device according to the invention, with the roof structure lowered.

FIG. 1 shows a rear view of a passenger car (otherwise not illustrated) which has a lowerable roof structure so that the vehicle is what is referred to as a convertible. The roof structure is preferably what is referred to as a hardtop, that is to say a roof structure with shell elements made of metal or plastic. Likewise, a roof structure as a soft top, in which the lowerable roof is essentially comprised of a fabric material, is also possible. At the back of the vehicle, a folding top compartment is formed for accommodating the lowered roof structure. This folding top compartment can be closed with a folding top compartment lid 1, which is mounted on the vehicle bodywork so as to make it fold up towards the rear in order to open the folding top compartment. If, next to or below the space for accommodating the roof structure, the folding top compartment contains an additional storage space, referred to as boot, the folding top compartment lid 1 can also be embodied so that it can fold up forwards in order to open this boot.

When the folding top compartment lid 1 is closed, a free space remains between a front edge region 2 of the folding top compartment lid 1 and a rear edge region 3 of a rear region 4 of the vehicle. This free space is closed in FIG. 1 by a cover unit 5 which has a front cover part 6, a rear cover part 7 and two lateral cover parts 8. When the roof structure is lowered, the free space between the folding top compartment lid 1 and rear region 4 is closed essentially without gaps by the four cover parts 6, 7, 8 of the cover unit 5. The cover parts 6, 7, 8 adjoin, approximately flush, the outer contour of the folding top compartment lid 1 and of the rear edge region 3 of the rear region 4.

When the roof structure is closed, the rear cover part 7 and the lateral cover parts 8 are folded away. A gap 17 (cf. FIG. 4) which is cleared by the folded-away, rear cover part 7 is penetrated by a rear and lower edge region of the extended roof structure, while each of the folded-away, lateral cover parts 8 clears a passage opening 18 (cf. FIG. 4) for a C pillar (designated by 9 in FIG. 3) of the closed roof structure. The front cover part 6 forms a parcel shelf in the interior of the vehicle in the closed position when the roof structure is closed.

The front cover part 6 is mounted so as to be capable of pivoting on the vehicle bodywork, while the rear cover part 7 is mounted so as to be capable of pivoting on the front cover part 6. The lateral cover parts 8 are mounted so as to be capable of pivoting on the folding top compartment lid 1. The mounting of the individual cover parts 6, 7, 8 as proposed according to the invention permits specific adjustment kinematics to be achieved, which will be explained in more detail below in the following FIGS. 2 to 5. Only the cover parts 6, 7, 8 of the cover unit 5 and the folding top compartment lid 1 and also, if appropriate, a component of the roof structure are illustrated in these figures in various positions.

Figure 2:
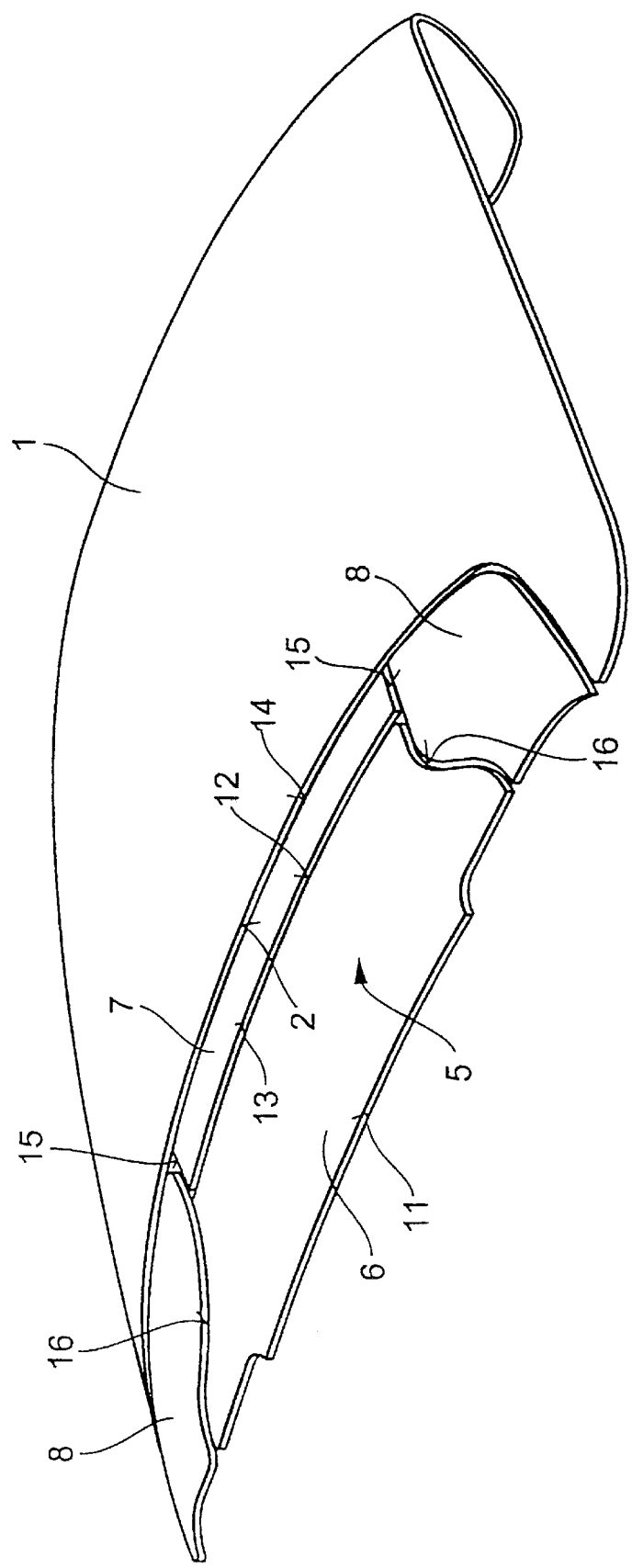
FIG. 2 shows a perspective view of a cover unit of the cover device according to the invention and of a folding top cover lid of the motor vehicle (otherwise not illustrated) with the roof structure lowered.

In FIG. 2, the roof structure is stowed away in the folding top compartment and the cover unit 5 is located in its closed position so that all the cover parts 6, 7, 8 serve to close the free space with an integrated shape. In the process, the lateral cover parts 8 and the rear cover part 7 are folded out.

In the position shown in FIG. 2, the front cover part 6 adjoins, with a front edge region 11, the rear edge region 3 of the rear region 4 (cf. FIG. 1). With a rear edge region 12, the front cover part 6 adjoins a front edge region 13 of the rear cover part 7. The rear cover part 7, for its part, adjoins, with a rear edge region 14, the front edge region 2 of the folding top compartment lid 1. The lateral cover parts 8 adjoin both the front edge region 2 of the folding top compartment lid 1 and lateral edge regions 15 and 16 of the rear cover part 7 and of the front cover part 6. Moreover, the lateral cover parts 8 adjoin the rear edge region 3 of the rear region 4 (cf. FIG. 1).

Figure 3:
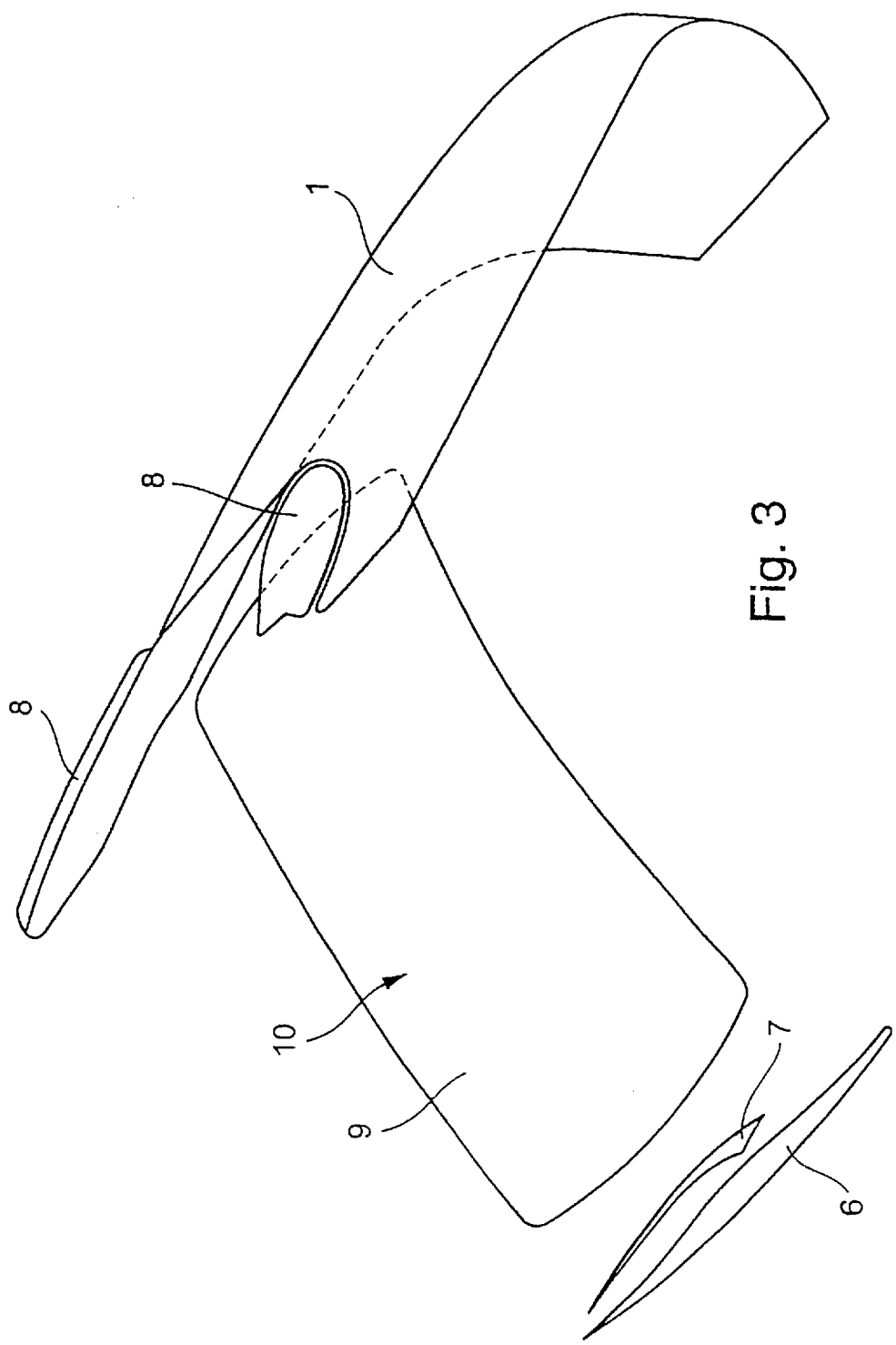
FIG. 3 shows a view similar to that of FIG. 2, but during a pivoting adjustment of the partially shown roof structure.

FIG. 3 shows a roof shell 9 of a roof structure 10 (embodied as a hardtop and otherwise not illustrated) during an adjustment process. In order to close the roof structure, the folding top compartment lid 1 is first folded up towards the rear. The lateral cover parts 8 which are coupled thereto remain folded out. The front cover part 6 is then folded up towards the front. The rear cover part 7 which is mounted thereon is simultaneously folded away onto the underside of the front cover part 6. In this way, a sufficiently large adjustment path is cleared for the roof structure 10. The adjustment path permits the roof structure 10 to pivot out of the folding top compartment over the passenger space of the vehicle. In FIG. 3, the front cover part 6 assumes a position in which it provides pivoting. When the roof structure 10 is closed, the front cover part 6 is folded back again rearwards and downwards, but the rear cover part 7 remains on the underside of the front cover part 6 in its folded-away state. Before the folding top compartment lid 1 is folded back forwards and downwards, the lateral cover parts 8 are folded away onto the underside of the folding top compartment lid 1.

Figure 4:
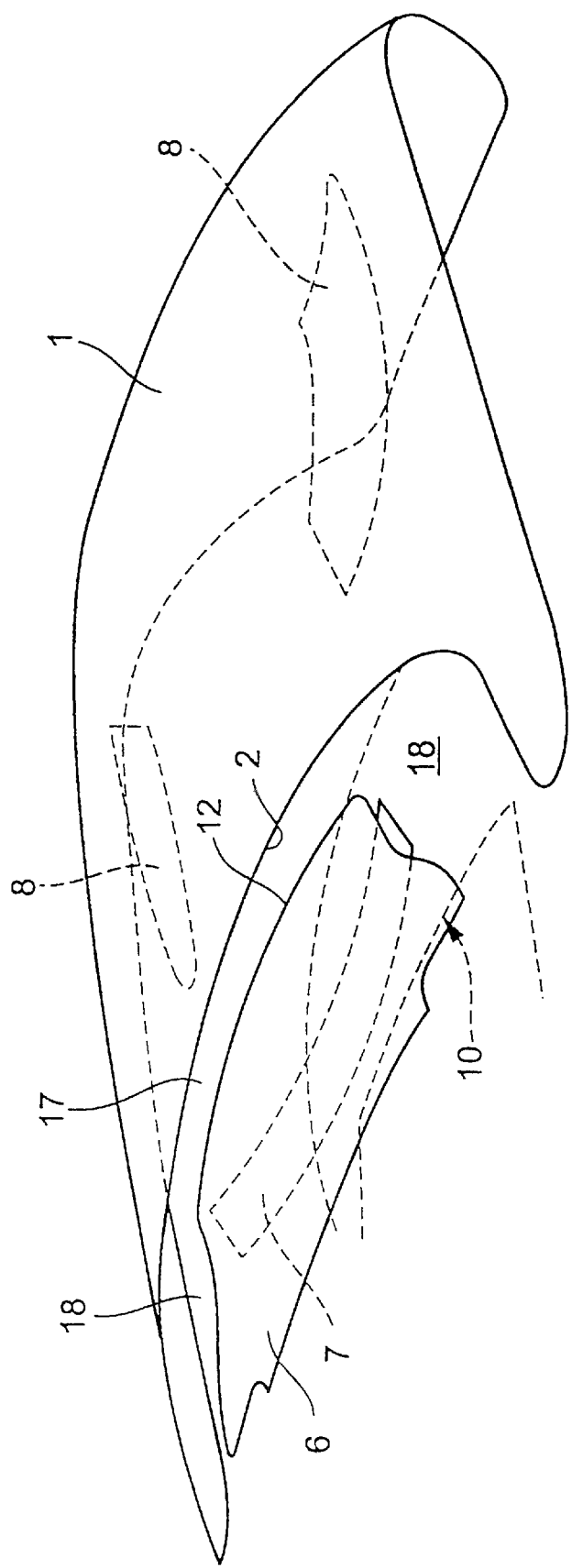
FIG. 4 shows a view similar to that of FIG. 2, but with the roof structure closed and in which the roof structure is only partially indicated.

FIG. 4 represents the state which results when the roof structure 10 is closed, the free space closed and the folding top compartment closed. In this state, the front cover part 6 and the folding top compartment lid 1 are in the same closed position which they also assume in FIG. 2 when the roof structure is lowered in order to close the free space and folding top compartment. In contrast to FIG. 2, in this state the rear cover part 7 is folded away onto the underside of the front cover part 6, and the lateral cover parts 8 are folded away onto the underside of the folding top compartment lid 1.

When the rear cover part 7 is folded away, a gap 17, which is penetrated by a lower and rear edge region (not illustrated) of the roof structure, is formed between the rear edge region 12 of the front cover part 6 and the front edge region 12 of the folding top compartment lid 1. The folded-away lateral cover parts 8 leave in each case a passage opening 18 for one of the C columns of the closed roof structure 10, indicated by broken lines, between the front cover part 6 and the folding top compartment lid 1. When the roof structure 10 is closed, the folded-away cover parts 7 and 8 are thus invisible, producing a particularly aesthetically attractive interior of the vehicle. This is possible in particular by virtue of the fact that the dimensioning of the lateral cover flaps 8 and of the rear cover flap 7 is selected such that when the roof structure 10 is closed, the front cover part 6 adjoins, with its rear edge region 12, the lower, inner edge region of the roof structure 10 essentially seamlessly.

Figure 5:
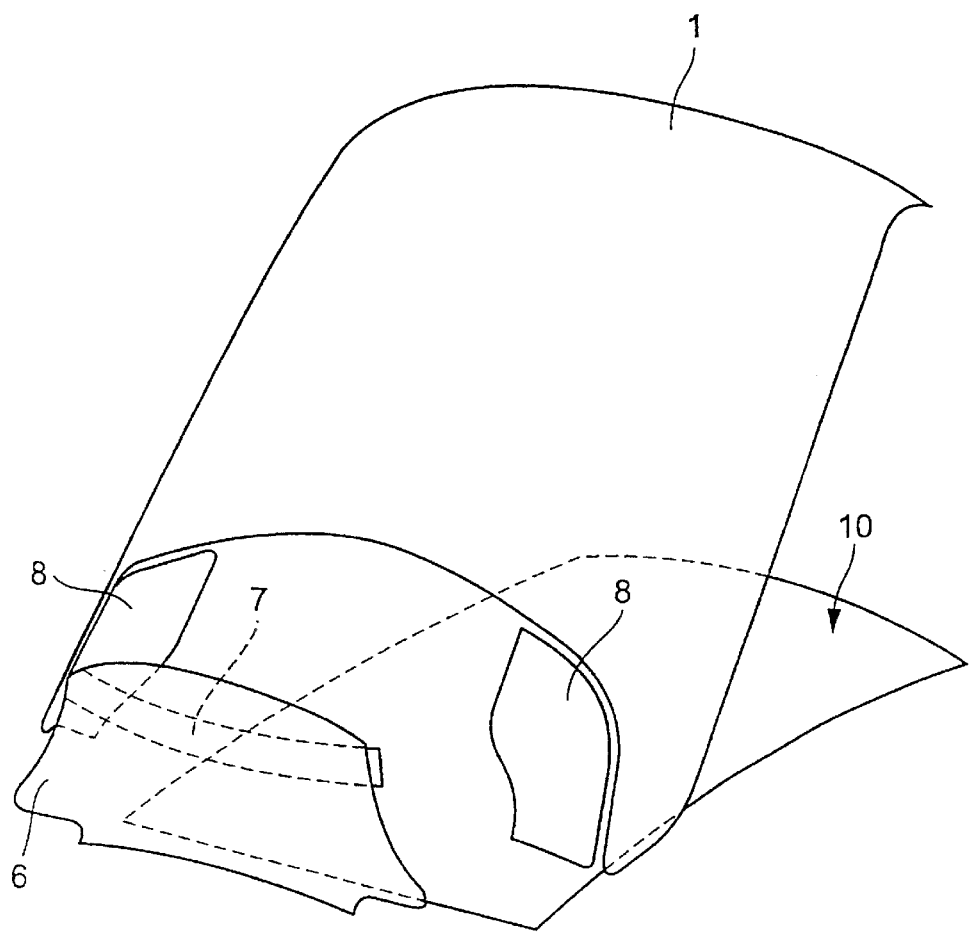
FIG. 5 shows a view similar to that of FIG. 2, but with the roof structure opened and partially shown, in a position in which it promotes loading.

FIG. 5 illustrates a state which results when the folding top compartment lid 1 is folded up towards the front when the roof structure 10 is accommodated in the folding top compartment in order to open the boot. According to FIG. 5, the folding top compartment lid is thus in its open position in order to load and unload the boot, the lateral cover parts 8 remaining in their folded-out state. In order to improve accessibility of the boot, which is arranged in the folding top compartment underneath a space which holds the roof structure 10, the roof structure 10, which is accommodated in the folding top compartment, assumes a position which promotes loading. In this position, the roof structure is folded up or pivoted up towards the front. At the same time, the front cover part 6 is also folded up towards the front in a position which promotes loading, illustrated in FIG. 5. In this position, which promotes loading, the rear cover part 7 is again folded away onto the underside of the front cover part 6. The position of the front cover part 6 which promotes loading expediently corresponds to its position which promotes pivoting. By means of this design, the movement courses of the individual components can be simplified and better synchronized.

The roof structure 10 is driven in a pivotable fashion, by a positive control device (not shown) which is supported on the bodywork, between the closed position which covers the interior of the vehicle and the open position in which it is pivoted into the folding top compartment. For automatic pivoting adjustment of the front cover part 6, suitable drive means (not shown) are provided which are mechanically positively coupled to the positive control device of the roof structure 10. Furthermore, suitable drive means (not shown), which are likewise mechanically positively coupled to the positive control device of the roof structure, are provided for pivoting adjustment of the rear cover part 7. As a result of this positive coupling of this drive means, automatically occurring kinematics are produced for the front cover part 6 and the rear cover part 7. These kinematics are adapted to the course of movement of the roof structure.

For pivoting adjustment of the two lateral cover parts 8, further drive means (also not shown) are provided which, in particular, permit a synchronous pivoting adjustment of the lateral cover parts 8. The last-mentioned drive means are expediently mechanically decoupled from the positive control device of the roof structure. The synchronization of the pivoting adjustment of the lateral cover parts 8 with the course of movement of the roof structure is carried out here by means of an electrical or electronic coupling to the positive control device.

When the roof structure 10 is stowed in the folding top compartment, the reverse procedure is carried out in comparison with the procedure described above, in order to close the roof structure. Correspondingly, starting from the state according to FIG. 4, the folding top compartment lid is first folded up towards the rear, and the lateral cover parts 8 are then folded out towards the front. With the pivoting out of the roof structure 10, the front cover part 6 is folded up towards the front into its position which promotes pivoting. In this position, the rear cover part 7 still bears against the underside of the front cover part 6. Correspondingly, the state according to FIG. 3 is then brought about. After the roof structure has been stowed in the folding top compartment, the front cover part 6 is folded rearwards and downwards. The rear cover part 7 is simultaneously folded up outwards. Finally, the folding top compartment lid 1 is folded downwards with folded-out, lateral cover parts 8 in order to close the folding top compartment. The individual cover parts 6, 7, 8 then interact in order to form the cover unit 5 and close the free space between the rear region 4 and folding top compartment lid 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A cover device for a folding top compartment of a vehicle with a lowerable roof for a hardtop vehicle adapted to pivot the roof structure into the folding top compartment arranged behind a rear region in a back part of the vehicle bodywork, comprising:

a folding top compartment lid by which the folding top compartment can be closed and which can be folded up towards the rear of the vehicle, and a cover unit, having a front cover part, a rear cover part, and two lateral cover parts, which can close a free space remaining between the front edge region of the closed folding top compartment lid and a rear edge region of the rear region, wherein the front cover part is pivotably mounted on the vehicle bodywork and, in the closed position of the cover unit, adjoins a rear edge region of the rear region and a front rear region of the rear cover part, wherein the rear cover part is pivotably mounted on the front cover part and, in the closed position of the cover unit when the roof structure is lowered into the folding top compartment, adjoins a rear edge region of the front cover part and the front edge region of the folding top compartment lid, and wherein each of the lateral cover parts is pivotably mounted on the folding top compartment lid and, in the closed position of the cover unit when the roof structure is lowered into the folding top compartment, adjoins lateral edge regions of the front cover part and rear cover part, the rear edge region of the rear region and the front edge region of the folding top compartment lid.

2. The cover device according to claim 1, wherein, when the roof structure is closed, the rear cover part is folded onto the underside of the front cover part.

3. The cover device according to claim 2, wherein the rear cover part is shaped in such a way that, in the closed position of the cover unit, it fills a gap which is formed when the roof structure is lowered between the rear edge region of the front cover part and the front edge region of the folding top compartment lid.

4. The cover device according to claim 1, wherein, when the roof structure is pivoted, the front cover part assumes a position in which it promotes pivoting, and wherein, in the position in which it promotes pivoting, the front cover part is folded up towards the front and the rear cover part is folded onto the underside of the front cover part.

5. The cover device according to claim 1, wherein the folding top compartment is formed as a boot underneath a space provided for accommodating the roof structure, the folding top compartment lid is capable of being folded up towards the front in order to open the boot, and, when the boot is opened, the front cover part assumes a position in which it promotes loading, in which position the front cover part is folded up towards the front and the rear cover part is folded onto the underside of the front cover part.

6. The cover device according to claim 1, wherein, when the roof structure is closed, the lateral cover parts are folded onto the underside of the folding top compartment lid.

7. The cover device according to claim 1, wherein drive means are provided for pivoting adjustment of the front cover part, the drive means being mechanically positively coupled to a positive control device, supported on the bodywork, in order to pivot the roof structure.

8. The cover device according to claim 1, wherein drive means are provided for pivoting adjustment of the rear cover part, the drive means being mechanically positively coupled to a positive control device, supported on the bodywork, for pivoting the roof structure.

9. The cover device according to claim 1, wherein drive means are provided for synchronous pivoting adjustment of the lateral cover parts which are electrically or electronically coupled to a positive control device, supported on the bodywork, for pivoting the roof structure.

10. The cover device according to claim 2, wherein, when the roof structure is pivoted, the front cover part assumes a position in which it promotes pivoting, and wherein, in the position in which it promotes pivoting, the front cover part is folded up towards the front and the rear cover part is folded onto the underside of the front cover part.

11. The cover device according to claim 3, wherein, when the roof structure is pivoted, the front cover part assumes a position in which it promotes pivoting, and wherein, in the position in which it promotes pivoting, the front cover part is folded up towards the front and the rear cover part is folded onto the underside of the front cover part.

12. The cover device according to claim 2, wherein the folding top compartment is formed as a boot underneath a space provided for accommodating the roof structure, the folding top compartment lid is capable of being folded up towards the front in order to open the boot, and, when the boot is opened, the front cover part assumes a position in which it promotes loading, in which position the front cover part is folded up towards the front and the rear cover part is folded onto the underside of the front cover part.

13. The cover device according to claim 3, wherein the folding top compartment is formed as a boot underneath a space provided for accommodating the roof structure, the folding top compartment lid is capable of being folded up towards the front in order to open the boot, and, when the boot is opened, the front cover part assumes a position in which it promotes loading, in which position the front cover part is folded up towards the front and the rear cover part is folded onto the underside of the front cover part.

14. The cover device according to claim 4, wherein the folding top compartment is formed as a boot underneath a space provided for accommodating the roof structure, the folding top compartment lid is capable of being folded up towards the front in order to open the boot, and, when the boot is opened, the front cover part assumes a position in which it promotes loading, in which position the front cover part is folded up towards the front and the rear cover part is folded onto the underside of the front cover part.

15. The cover device according to claim 2, wherein, when the roof structure is closed, the lateral cover parts are folded onto the underside of the folding top compartment lid.

16. The cover device according to claim 3, wherein, when the roof structure is closed, the lateral cover parts are folded onto the underside of the folding top compartment lid.

17. The cover device according to claim 4, wherein, when the roof structure is closed, the lateral cover parts are folded onto the underside of the folding top compartment lid.

18. The cover device according to claim 5, wherein, when the roof structure is closed, the lateral cover parts are folded onto the underside of the folding top compartment lid.

19. The cover device according to claim 2, wherein drive means are provided for pivoting adjustment of the front cover part, the drive means being mechanically positively coupled to a positive control device, supported on the bodywork, in order to pivot the roof structure.

20. The cover device according to claim 3, wherein drive means are provided for pivoting adjustment of the front cover part, the drive means being mechanically positively coupled to a positive control device, supported on the bodywork, in order to pivot the roof structure.

21. The cover device according to claim 4, wherein drive means are provided for pivoting adjustment of the front cover part, the drive means being mechanically positively coupled to a positive control device, supported on the bodywork, in order to pivot the roof structure.

22. The cover device according to claim 5, wherein drive means are provided for pivoting adjustment of the front cover part, the drive means being mechanically positively coupled to a positive control device, supported on the bodywork, in order to pivot the roof structure.

23. The cover device according to claim 6, wherein drive means are provided for pivoting adjustment of the front cover part, the drive means being mechanically positively coupled to a positive control device, supported on the bodywork, in order to pivot the roof structure.

24. The cover device according to claim 2, wherein drive means are provided for pivoting adjustment of the rear cover part, the drive means being mechanically positively coupled to a positive control device, supported on the bodywork, for pivoting the roof structure.

25. The cover device according to claim 3, wherein drive means are provided for pivoting adjustment of the rear cover part, the drive means being mechanically positively coupled to a positive control device, supported on the bodywork, for pivoting the roof structure.

26. The cover device according to claim 4, wherein drive means are provided for pivoting adjustment of the rear cover part, the drive means being mechanically positively coupled to a positive control device, supported on the bodywork, for pivoting the roof structure.

27. The cover device according to claim 5, wherein drive means are provided for pivoting adjustment of the rear cover part, the drive means being mechanically positively coupled to a positive control device, supported on the bodywork, for pivoting the roof structure.

28. The cover device according to claim 6, wherein drive means are provided for pivoting adjustment of the rear cover part, the drive means being mechanically positively coupled to a positive control device, supported on the bodywork, for pivoting the roof structure.

29. The cover device according to claim 7, wherein drive means are provided for pivoting adjustment of the rear cover part, the drive means being mechanically positively coupled to a positive control device, supported on the bodywork, for pivoting the roof structure.

30. The cover device according to claim 2, wherein drive means are provided for synchronous pivoting adjustment of the lateral cover parts which are electrically or electronically coupled to a positive control device, supported on the bodywork, for pivoting the roof structure.

31. The cover device according to claim 3, wherein drive means are provided for synchronous pivoting adjustment of the lateral cover parts which are electrically or electronically coupled to a positive control device, supported on the bodywork, for pivoting the roof structure.

32. The cover device according to claim 4, wherein drive means are provided for synchronous pivoting adjustment of the lateral cover parts which are electrically or electronically coupled to a positive control device, supported on the bodywork, for pivoting the roof structure.

33. The cover device according to claim 5, wherein drive means are provided for synchronous pivoting adjustment of the lateral cover parts which are electrically or electronically coupled to a positive control device, supported on the bodywork, for pivoting the roof structure.

34. The cover device according to claim 6, wherein drive means are provided for synchronous pivoting adjustment of the lateral cover parts which are electrically or electronically coupled to a positive control device, supported on the bodywork, for pivoting the roof structure.

35. The cover device according to claim 7, wherein drive means are provided for synchronous pivoting adjustment of the lateral cover parts which are electrically or electronically coupled to a positive control device, supported on the bodywork, for pivoting the roof structure.

36. The cover device according to claim 8, wherein drive means are provided for synchronous pivoting adjustment of the lateral cover parts which are electrically or electronically coupled to a positive control device, supported on the bodywork, for pivoting the roof structure.

* * * * *